Patented Apr. 29, 1930

1,756,537

UNITED STATES PATENT OFFICE

WILLIAM J. COTTON, OF BUFFALO, NEW YORK, ASSIGNOR TO NATIONAL ANILINE & CHEMICAL CO., INC., OF NEW YORK, N. Y., A CORPORATION OF NEW YORK

SEPARATION OF MONONITRONAPHTHALENE DISULPHONIC ACIDS

No Drawing.   Application filed February 13, 1926.   Serial No. 88,149.

The present invention relates to the separation of 2-nitronaphthalene-4.8-disulphonic acid from certain other nitronaphthalene disulphonic acids obtainable by the sulphonation and subsequent nitration of naphthalene.

In the disulphonation of naphthalene by the action of oleum, preferably containing about 25–26 percent free sulfur trioxide, on naphthalene at low temperatures, for example at about 0° to 25° C., there may be obtained a mixture of naphthalene disulphonic acids in which the 1.5-disulphonic acid and 1.6-disulphonic acid are the main constituents, the former being present usually in greater quantity than the latter.

When naphthalene - 1.5 - disulphonic acid alone, or in admixture with naphthalene-1.6-disulphonic acid as obtained, for example, in the disulphonation of naphthalene as above mentioned, is subjected to nitration, for example with nitric acid in the presence of sulfuric acid, for the production of a mono - nitronaphthalene - disulphonic acid, there may be obtained a mixture of mono-nitro-disulphonic acids. For example, there may be formed the 1-nitro- and the 2-nitro-naphthalene-4.8-disulphonic acid from the 1.5-disulphonic acid and the 1-nitronaphthalene-3.8-disulphonic acid and 2-nitronaphthalene-4.7-disulphonic acid from the 1.6-disulphonic acid. Of these acids, the 2-nitronaphthalene-4.7-disulphonic acid is usually produced, if at all, in the least amount.

According to the present invention, it has been found that 2-nitronaphthalene-4.8-disulphonic acid may be separated by precipitation and subsequent isolation as the magnesium salt from solutions, particularly acid solutions, containing it and one or more of the above mentioned nitro-naphthalene disulphonic acids, more especially from the 1.4.8 and 1.3.8-nitronaphthalene-disulphonic acids. The magnesium salt of the 2-nitronaphthalene-4.8-disulphonic acid is much less soluble than the magnesium salts of the 1.4.8 and 1.3.8-nitronaphthalene-disulphonic acids.

In carrying out the process, a magnesium salt, such as the chloride, sulfate, oxide, hydroxide, carbonate or other suitable magnesium compound, is added to a solution, preferably an acid solution, comprising a mixture of the aforesaid nitronaphthalene disulphonic acids at any suitable temperature, for example from about 0° to around 100° C., preferably around 75°–85° C. The magnesium salt of the 2-nitro-naphthalene-4.8-disulphonic acid which is formed crystallizes out from the cold solution, preferably at a temperature around 0° to 10° C., and hot solutions are best cooled to this temperature to effect crystallization. The crystallization is preferably effected from acid solutions, and in case the solution comprises the neutral or alkaline salts of the aforesaid nitronaphthalene disulphonic acids, it is preferably acidified by the addition of any suitable acid, e. g., hydrochloric, sulfuric, acetic acid, etc., either before adding the magnesium salt or before crystallization is allowed to take place. As a rule, the amount of magnesium salt added is slightly in excess of that calculated to interact with and transform the 2-nitronaphthalene-4.8-disulphonic acid into its magnesium salt, but more than this amount can be used.

The following examples will further illustrate the invention, but it is understood that the invention is not limited thereto. The parts are by weight.

*Example 1.*—The nitrated sulphonation mass resulting from the nitration of ten parts of naphthalene-1.5-disulphonic acid with about 4.9 parts of a sulfuric-nitric acid mixture containing about 46 percent nitric acid at a temperature of about 30° to 35° C. to effect mononitration, is dissolved in a sufficient amount of water to produce a solution containing about 5 percent of sulfuric acid. The solution is heated to about 70°–75° C. and about 0.5 to 0.6 parts of magnesium oxide slowly added, with stirring. After the magnesium oxide has dissolved, the solution is cooled to around 5° to 10° C., and the magnesium salt of the 2-nitro-naphthalene-4.8-disulphonic acid which crystallizes out in fine needles is recovered by filtration.

*Example 2.*—The nitrated sulphonation mass or mixture resulting from sulphonating at a temperature of about 5° to 30° C. of 5 parts naphthalene with about 24 parts of 26 percent oleum and subsequently diluting the sulphonation mass with 2 to 3 parts of water and then subjecting it to nitration by the addition thereto of 8.5 parts of a sulfuric-nitric acid mixture containing 29 percent of nitric acid, 57 percent sulfuric acid and 14 percent water, is dissolved in a sufficient amount of water and ice to produce a solution containing about 20 percent of free sulfuric acid. The solution is heated to about 80° C. and a concentrated aqueous solution containing about 19 to 20 parts of magnesium chloride is added. After a short time, the solution is cooled to 10°–20° C., and after standing for a sufficient length of time, the magnesium salt of 2-nitronaphthalene-4.8-disulphonic acid which crystallizes out is recovered by filtration.

It will be understood that various changes may be made in the process as above described without departing from the spirit and scope of the invention. For example, the solution from which the magnesium salt crystallizes may vary in acidity from a substantially neutral to a strongly acid solution. Further, the solution containing the mononitronaphthalene-disulphonic acids can be obtained in any suitable manner such as, for example, treating the nitrated sulphonation mass with lime, separating the precipitated calcium sulfate, and employing the filtrate as the initial material from which to separate the 2-nitronaphthalene-4.8-disulphonic acid as the magnesium salt; or, if desired, the filtrate from the calcium sulfate may be treated with sodium carbonate, the calcium carbonate filtered off, and filtrate containing the sodium salts of the nitro-disulphonic acids employed for treatment with a magnesium salt. In any case, it is preferable to precipitate or crystallize the magneisum salt from an acid solution instead of a neutral or alkaline solution. If desired, the magneisum salt of the 2-nitronaphthalene-4.8-disulphonic acid may be further purified by re-crystallization from hot water.

In the claims, it will be understood that the term "another nitronaphthalene disulphonic acid" refers to and includes those acids obtainable by the disulphonation and subsequent mononitration of naphthalene at comparatively low temperatures.

I claim:

1. In the separation of 2-nitronaphthalene-4.8-disulphonic acid from another nitronaphthalene disulphonic acid, the process which comprises treating a hot solution containing said disulphonic acids with a magnesium salt to form the magnesium salt of the 2-nitronaphthalene-4.8-disulphonic acid, and subsequently cooling the solution to crystallize out said magnesium salt from said solution.

2. In the isolation of 2-nitronaphthalene-4.8-disulphonic acid from a solution containing said acid and at least one other mononitronaphthalene disulphonic acid, the process which comprises adding to said solution a magnesium compound capable of reacting with said first mentioned acid to form a magnesium salt thereof and crystallizing out the magnesium salt of said acid from the solution.

3. In the separation of 2-nitronaphthalene-4.8-disulphonic acid from another nitronaphthalene disulphonic acid, the process which comprises treating an acid solution containing said sulphonic acids with a magnesium compound capable of reacting with said first acid to form a magnesium salt thereof and crystallizing out the magnesium salt of said first acid from the acid solution.

4. In the recovery of 2-nitronaphthalene-4.8-disulphonic acid in the form of its magnesium salt, the process which comprises dissolving in water the reaction mixture resulting from the disulphonation and subsequent mononitration of naphthalene at low temperatures, and adding a soluble magnesium salt of an inorganic acid to the resulting acid solution to form and precipitate by crystallization the magnesium salt of 2-nitronaphthalene-4.8-disulphonic acid therefrom.

5. In the separation of 2-nitronaphthalene-4.8-disulphonic acid from 1.3.8 and 1.4.8-nitronaphthalene-disulphonic acids, the process which comprises treating a solution containing said acids in the free state with a magnesium salt adapted to react therewith and crystallizing out the magnesium salt of the 2-nitronaphthalene-4.8-disulphonic acid from said acid solution.

6. In the separation of 2-nitronaphthalene-4.8-disulphonic acid from the aqueous solution of the acid reaction mixture resulting from the disulphonation and subsequent mononitration of naphthalene, the process which comprises dissolving in said solution an amount of magnesium salt slightly in excess of that required to combine with and convert the 2-nitronaphthalene-4.8-disulphonic acid which is present into its magnesium salt, and precipitating said magnesium salt from said acid solution.

7. In the process of separating 2-nitronaphthalene-4.8-disulphonic acid from a solution containing it and 1-nitronaphthalene-4.8-disulphonic acid, the step which comprises forming the magnesium salt of the first named acid and causing it to crystallize from an acid aqueous medium containing in solution said acids and a magnesium salt.

8. In the separation of 2-nitronaphthalene-4.8-disulphonic acid from a solution containing it and another mononitronaphthalene-disulphonic acid, the process which comprises treating an acid solution containing said disulphonic acids with a soluble magnesium salt and subsequently recovering the magnesium salt of 2-nitronaphthalene-4.8-disulphonic acid from the solution.

9. In the separation of 2-nitronaphthalene-4.8-disulphonic acid from a solution containing it and 1-nitronaphthalene-4.8-disulphonic acid, the process which comprises treating a solution containing said acids in admixture with sulfuric acid with a soluble magnesium compound, and recovering the magnesium salt of 2-nitronaphthalene-4.8-disulphonic acid by crystallization from the acid solution.

10. In the separation of 2-nitronaphthalene-4.8-disulphonic acid from isomeric nitronaphtalene-disulphonic acids, the process which comprises forming the magnesium salt of 2-nitronaphthalene-4.8-disulphonic acid and causing it to crystallize from a solution having an acid reaction.

11. In the separation of 2-nitronaphthalene-4.8-disulphonic acid from isomeric nitronaphthalene-disulphonic acids, the process which comprises forming the magnesium salt of 2-nitronaphthalene-4.8-disulphonic acid and causing it to crystallize from a solution containing free inorganic acid.

12. In the separation of 2-nitronaphthalene-4.8-disulphonic acid from isomeric nitronaphthalene-disulphonic acids, the process which comprises forming the magnesium salt of 2-nitronaphthalene-4.8-disulphonic acid and causing it to crystallize from a solution containing about 5 to 20 percent of free inorganic acid.

13. In the separation of 2-nitronaphthalene-4.8-disulphonic acid from isomeric nitronaphthalene-disulphonic acids, the process which comprises forming the magnesium salt of 2-nitronaphthalene-4.8-disulphonic acid and causing it to crystallize from a solution containing about 20 percent of free sulfuric acid.

In testimony whereof I affix my signature.

WILLIAM J. COTTON.